(12) United States Patent
Jung et al.

(10) Patent No.: US 12,454,451 B2
(45) Date of Patent: Oct. 28, 2025

(54) WATER PURIFICATION TANK AND WATER PURIFIER COMPRISING SAME

(71) Applicant: COWAY CO., LTD., Gongju-si (KR)

(72) Inventors: Hee Do Jung, Seoul (KR); Jong Hwan Lee, Seoul (KR); Hyun Goo Kim, Seoul (KR); Yoo Won Oh, Seoul (KR); Chan Jung Park, Seoul (KR); Woong Jung, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 265 days.

(21) Appl. No.: 18/248,786

(22) PCT Filed: Oct. 14, 2021

(86) PCT No.: PCT/KR2021/014236
§ 371 (c)(1),
(2) Date: Apr. 12, 2023

(87) PCT Pub. No.: WO2022/080891
PCT Pub. Date: Apr. 21, 2022

(65) Prior Publication Data
US 2023/0382710 A1    Nov. 30, 2023

(30) Foreign Application Priority Data
Oct. 14, 2020    (KR) .................. 10-2020-0132822

(51) Int. Cl.
*B67D 3/00*    (2006.01)
*B01D 35/04*    (2006.01)
*C02F 1/00*    (2023.01)

(52) U.S. Cl.
CPC .......... *B67D 3/0064* (2013.01); *B01D 35/04* (2013.01); *C02F 1/003* (2013.01); *C02F 2307/06* (2013.01)

(58) Field of Classification Search
CPC . C02F 1/001; C02F 1/003; C02F 9/20; B67D 2210/0001; B67D 1/0857;
(Continued)

(56) References Cited

U.S. PATENT DOCUMENTS 1,432,351 A * 10/1922 Walker ...................... F23K 3/00
210/284
2,047,539 A *  7/1936 Wolf ........................ B67D 1/07
222/395

(Continued)

FOREIGN PATENT DOCUMENTS

KR    10-2014-0055168 A    5/2014
KR    10-2016-0139871 A    12/2016
(Continued)

OTHER PUBLICATIONS

International Search Report mailed on Jan. 20, 2022 in PCT/KR2021/014236 filed on Oct. 14, 2021, 2 pages).

*Primary Examiner* — Charles P. Cheyney
(74) *Attorney, Agent, or Firm* — Oblon, McClelland, Maier & Neustadt, L.L.P.

(57) ABSTRACT

A water purifier that purifies water to provide purified water may include: a purified water tank accommodating the purified water; and a discharge port discharging the purified water to an outside of the water purifier. The purified water tank may include: a tank main body that provides an accommodation space for accommodating the purified water; a discharge buffer part having an inlet which communicates with the accommodation space so that the purified water in the accommodation space flows in the discharge buffer part, the discharge buffer part extending in an up-down direction; an outlet tube including an insertion portion extending downward in the discharge buffer part to discharge the purified water to the discharge port through a discharge flow path; and a gasket extending from the inser- (Continued)

tion portion to an inner peripheral surface of the discharge buffer part to reduce sloshing of the purified water in the discharge buffer part.

9 Claims, 7 Drawing Sheets

(58) Field of Classification Search
CPC .... B67D 1/0884; B67D 3/0064; B01D 35/04; B01D 35/30; B01D 35/00
USPC .......................................... 222/129.1; 62/3.64
See application file for complete search history.

(56) References Cited

U.S. PATENT DOCUMENTS

| | | | | |
|---|---|---|---|---|
| 2,369,915 | A * | 2/1945 | Quinn | B01D 24/18 210/232 |
| 4,683,054 | A * | 7/1987 | Turnbull | C02F 1/003 210/138 |
| 4,946,485 | A * | 8/1990 | Larsson | B01D 53/261 96/136 |
| 5,417,348 | A * | 5/1995 | Perrin | B67D 1/0059 4/675 |
| 5,552,043 | A * | 9/1996 | Noordhoff | C02F 1/42 210/232 |
| 5,683,576 | A * | 11/1997 | Olsen | C02F 1/78 210/138 |
| 5,785,848 | A * | 7/1998 | Strand | C02F 1/003 210/283 |
| 5,788,859 | A | 8/1998 | Biere | |
| 6,080,313 | A * | 6/2000 | Kelada | C02F 9/20 210/266 |
| 6,099,735 | A * | 8/2000 | Kelada | C02F 1/441 210/257.2 |
| 6,251,167 | B1 * | 6/2001 | Berson | B01D 19/0005 95/263 |
| 6,370,884 | B1 * | 4/2002 | Kelada | F25B 21/02 62/3.3 |
| 7,294,266 | B2 * | 11/2007 | Vetterli | B01D 29/902 210/283 |
| 10,836,653 | B2 * | 11/2020 | Bermudes | C02F 1/28 |
| 2002/0060175 | A1 * | 5/2002 | Conrad | C02F 1/003 210/138 |
| 2003/0012849 | A1 * | 1/2003 | Berson | B01F 23/232 426/66 |
| 2004/0007516 | A1 * | 1/2004 | Fritze | C02F 9/20 210/263 |
| 2005/0173320 | A1 * | 8/2005 | Summer | B01D 35/18 210/184 |
| 2012/0325342 | A1 * | 12/2012 | Beatty | C02F 9/20 137/544 |
| 2018/0099854 | A1 * | 4/2018 | Jung | C02F 9/20 |

FOREIGN PATENT DOCUMENTS

KR 10-2019-0022956 A 3/2019
KR 10-2019-0115270 A 10/2019

* cited by examiner

WATER PURIFICATION TANK AND WATER PURIFIER COMPRISING SAME

TECHNICAL FIELD

The present disclosure relates to a purified water tank and a water purifier including the same.

BACKGROUND ART

In general, a water purifier is a device that receives water from a water supply source such as a tap water, filters it into purified water, and provides purified water to a user. Such purified water may be immediately provided to the user, but may be provided as cold water after being cooled to a predetermined temperature or lower, or as hot water after being heated to a predetermined temperature or higher.

The applicant's Korean Patent Application Publication No. 10-2018-0063022 "Water treatment device" and Korean Patent Application Publication No. 10-2014-0055169 "Cold water tank" disclose a tank for cooling purified water and providing it to users. In such a conventional tank, purified water flows into the tank through an inlet pipe and is temporarily accommodated in the tank. In addition, the purified water is cooled to a predetermined temperature or less while being temporarily accommodated in the tank, and the purified water cooled to the predetermined temperature or less is discharged to the outside through an outlet pipe. The flow of purified water inside the water purifier described above may be controlled by a valve. For example, when an inlet valve provided in the inlet pipe is opened, purified water flows into the tank.

However, conventional water purifiers have a problem in that when an outlet valve provided in the outlet pipe is removed, a small amount of purified water remaining after a user extracts purified water, that is, residual water, is arbitrarily extracted. Specifically, when the inlet valve is opened and closed in a state in which gas and purified water are mixed inside the purified water tank, the flow state of the purified water flowing into the tank is changed and vibration occurs due to the pressure change in the gas layer. As a result, the purified water inside the tank sloshes, and a small amount of purified water flows into the outlet pipe due to vibration of the gas layer and sloshing of purified water. As such, when purified water flows into the outlet pipe, a small amount of purified water remaining in the outlet pipe, i.e., residual water, is discharged to the outside.

"Water purifier" of Korean Patent Application Publication No. 10-2017-0125560 controls the discharge of purified water to the outside through a valve on the water outlet side. Recently, however, as the need for a small water purifier increases, various attempts have been made to reduce the size of the water purifier, and there is a demand for a small water purifier whose size is reduced by reducing the number of valves provided inside the water purifier.

Accordingly, there is a need for a device capable of reducing the size of the water purifier and preventing the discharge of unintended residual water due to opening and closing of the inlet valve.

PRIOR ART DOCUMENT (Patent Document 1) Korean Patent Application Publication No. 10-2018-0063022 (published on Jun. 11, 2018)
(Patent Document 2) Korean Patent Application Publication No. 10-2014-0055169 (published on May 9, 2014)
(Patent Document 3) Korean Patent Application Publication No. 10-2017-0125560 (published on Nov. 15, 2017)

DETAILED DESCRIPTION OF INVENTION

Technical Problems

In view of the above, one embodiment of the present disclosure provides a water purifier capable of preventing discharge of residual water by reducing sloshing of purified water contained in a purified water tank.

In addition, one embodiment of the present disclosure provides a compact water purifier by reducing the number of valves provided inside the water purifier.

Further, one embodiment of the present disclosure provides a water purifier in which the number of valves is reduced, so that the cost of the valves can be reduced, the internal configuration thereof can be simplified, and the manufacturing process thereof can be simplified.

Technical Solution

In accordance with an aspect of the present disclosure, there may be provided a water purifier that purifies water to provide purified water, the water purifier including: a purified water tank for accommodating the purified water; and a discharge port for discharging the purified water to an outside of the water purifier, wherein the purified water tank includes: a tank main body that provides an accommodation space for accommodating the purified water; a discharge buffer part having an inlet which communicates with the accommodation space so that the purified water in the accommodation space flows in the discharge buffer part, the discharge buffer part extending in an up-down direction; an outlet tube including an insertion portion extending downward in the discharge buffer part to discharge the purified water to the discharge port through a discharge flow path; and a gasket extending from the insertion portion to an inner peripheral surface of the discharge buffer part to reduce sloshing of the purified water in the discharge buffer part.

Further, the discharge buffer part may further include a communication hole, the discharge buffer part may communicate with the accommodation space through the communication hole, and the communication hole may be provided above the gasket.

A lower end of the insertion portion may be disposed below the gasket.

The purified water tank may further include an inlet part that is connected to an upper portion of the tank main body and guides the purified water into the accommodation space, the inlet may be provided below the gasket and communicate the discharge buffer part and the accommodation space, and the purified water in the accommodation space may flow to the discharge buffer part through the inlet.

The gasket may include one or more through-holes formed to penetrate the gasket in the up-down direction The outlet tube may further include a sealing portion that seals between the insertion portion and the discharge buffer part to prevent gas from flowing between the insertion portion and the discharge buffer part.

The gasket may be fixedly supported on any one of the discharge buffer part and the outlet tube.

The water purifier may further include an inlet valve that selectively blocks a passage through which the purified water flows into the purified water tank.

The discharge flow path may be open to communicate with the outside of the water purifier, and the flow of the purified water to the discharge port may be controlled by opening and closing of the inlet valve.

In accordance with another aspect of the present disclosure, there may be provided a purified water tank including: a tank main body that provides an accommodation space for accommodating purified water; a discharge buffer part having an inlet which communicates with the accommodation space so that the purified water in the accommodation space flows the discharge buffer part, the discharge buffer part extending in an up-down direction; an outlet tube including an insertion portion extending downward in the discharge buffer part to discharge the purified water to a discharge port through a discharge flow path; and a gasket extending from the insertion portion to an inner peripheral surface of the discharge buffer part to reduce sloshing of the purified water in the discharge buffer part.

Effect of Invention

According to one embodiment of the present disclosure, the discharge of residual water can be prevented by reducing the sloshing of purified water contained in the purified water tank.

In addition, according to one embodiment of the present disclosure, the size of the water purifier can be minimized by reducing the number of valves provided inside the water purifier.

Further, according to one embodiment of the present disclosure, by reducing the number of valves, it is possible to reduce the cost of the valves, simplify the internal configuration of the water purifier, and simplify the manufacturing process of the water purifier.

BEST MODE FOR CARRYING OUT THE INVENTION

Hereinafter, a preferred embodiment of the present disclosure for implementing the spirit of the present disclosure will be described in more detail with reference to the accompanying drawings.

However, in describing the present disclosure, detailed descriptions of known configurations or functions may be omitted to clarify the present disclosure.

When an element is referred to as being 'connected' to, 'supported' by, 'flowed' into, 'discharged' out, 'flowed', or 'communicated' with another element, it should be understood that the element may be directly connected to, supported by, flowed into, discharged out, flowed or communicated with the other element, but that other elements may exist in the middle.

The terms used in the present disclosure are only used for describing specific embodiments, and are not intended to limit the present disclosure. Singular expressions include plural expressions unless the context clearly indicates otherwise.

In the present specification, it is to be understood that the terms such as "including" are intended to indicate the existence of the certain features, areas, integers, steps, actions, elements and/or combinations thereof disclosed in the specification, and are not intended to preclude the possibility that one or more other certain features, areas, integers, steps, actions, elements and/or combinations thereof may exist or may be added.

In addition, in the present specification, expressions for directions such as upward and downward are described based on the drawings, and it is said in advance that they may be expressed differently when the direction of the object is changed. Meanwhile, in the present specification, an up-down direction may be a x-axis direction of FIG. 1 and a front-rear direction may be the y-axis direction of FIG. 1. In addition, a left-right direction may be the x-axis direction of FIG. 1.

Hereinafter, a specific configuration of a water purifier 1 according to one embodiment of the present disclosure will be described with reference to the drawings.

Figure 1:
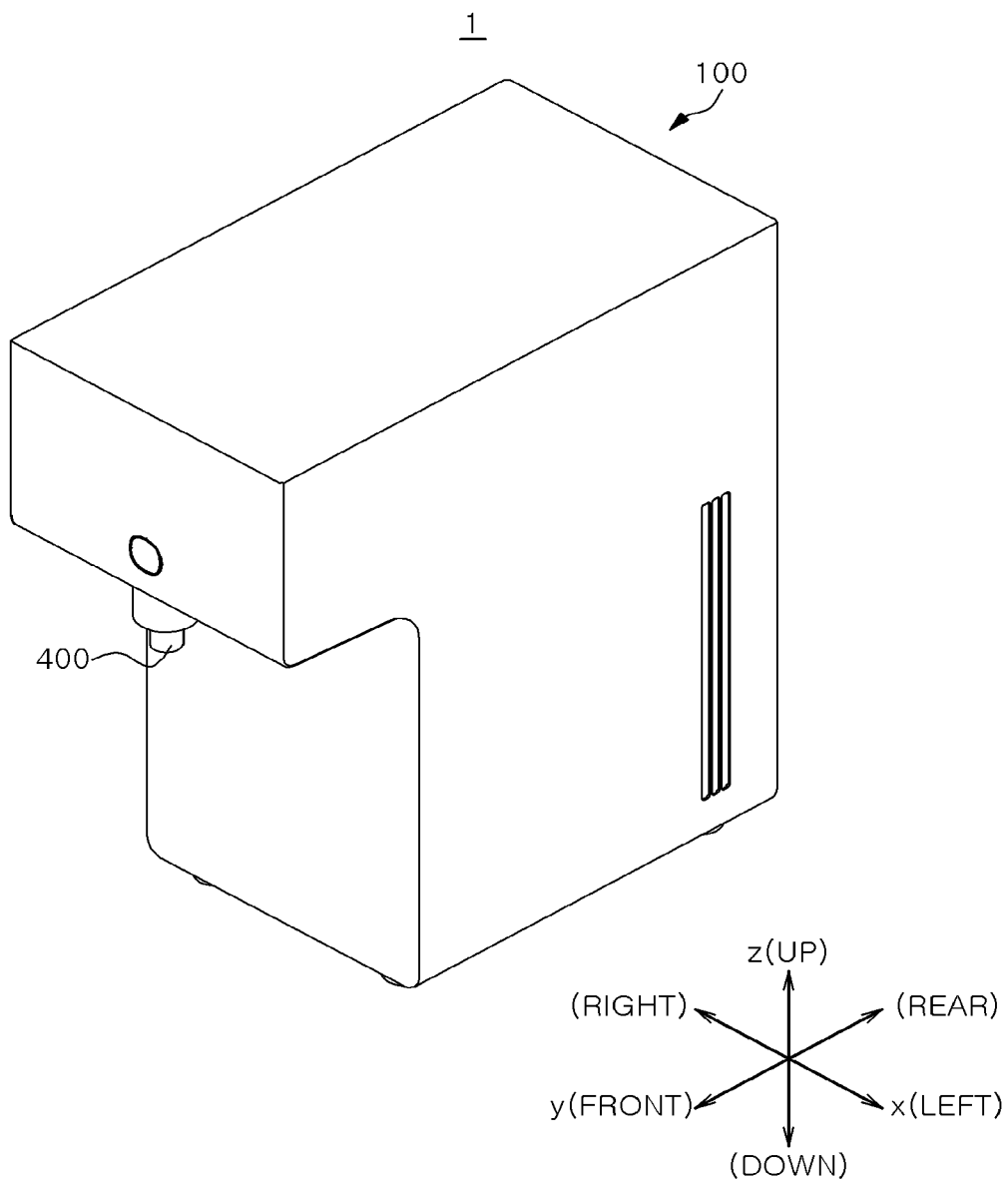
FIG. 1 is a perspective view showing a water purifier according to one embodiment of the present disclosure.
Figure 2:
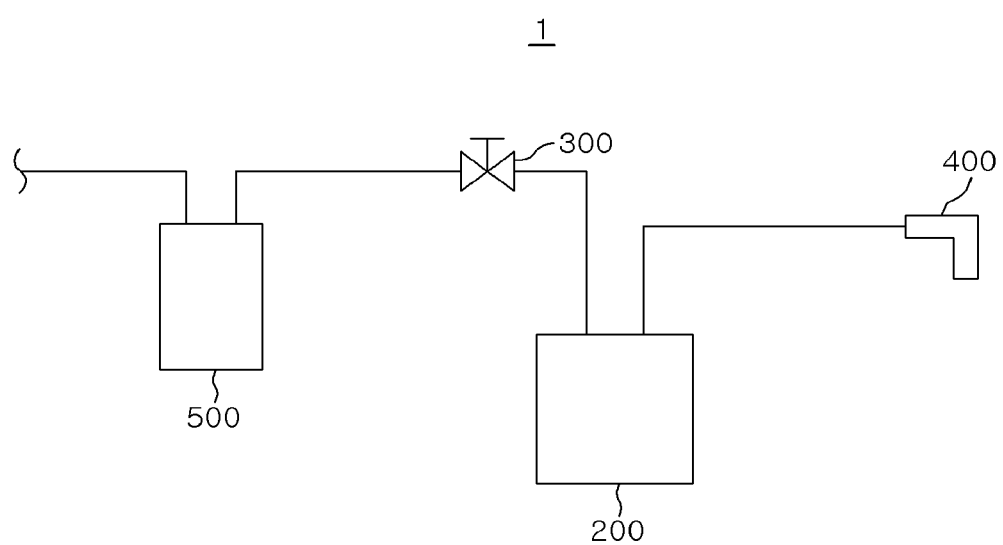
FIG. 2 is a conceptual diagram schematically illustrating a flow of water in the water purifier according to one embodiment of the present disclosure.

Hereinafter, referring to FIGS. 1 and 2, the water purifier 1 according to one embodiment of the present disclosure can provide clean water to users by filtering water supplied from the outside. For example, the water purifier 1 can receive water from a water supply source (not shown) such as tap water, and can filter the supplied water into clean water. The water purifier 1 may include a frame 100, a purified water tank 200, an inlet valve 300, a discharge port 400, a filter 500, and a discharge flow path 600.

Meanwhile, water introduced into the water purifier 1 from the outside may be classified into raw water and purified water. Hereinafter, among water introduced into the water purifier 1 from the outside, water that has not passed through the filter 500 is defined as raw water, and water filtered through the filter 500 is defined as purified water.

The frame 100 may support the purified water tank 200, the inlet valve 300, the discharge port 400, and the filter 500. The frame 100 may provide a space in which the purified water tank 200, the inlet valve 300, and the filter 500 are accommodated, and the discharge port 400 for discharging purified water may be supported on the outside of the frame 100.

Figure 3:
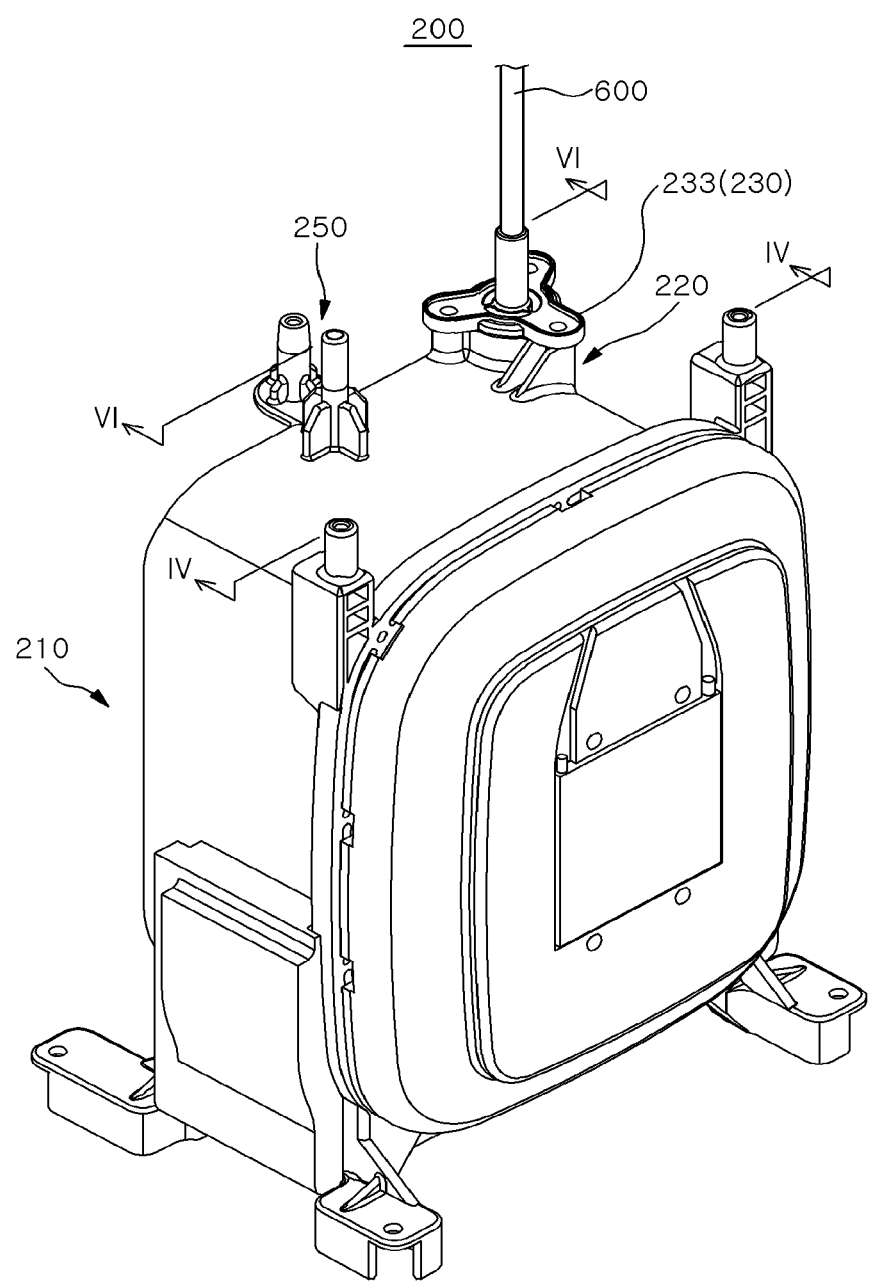
FIG. 3 is a perspective view of a purified water tank of FIG. 2.
Figure 4:
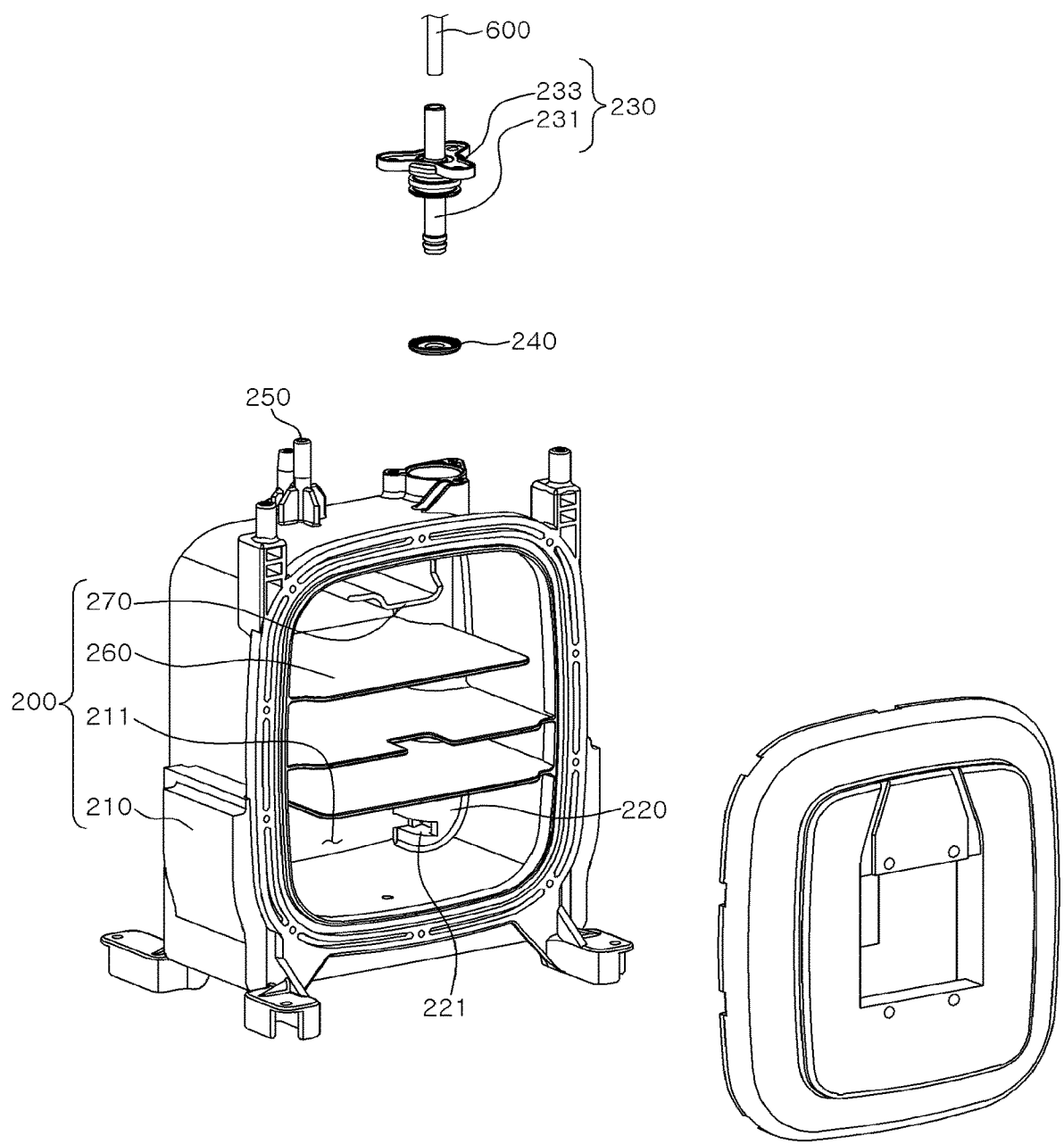
FIG. 4 is an exploded perspective view of the purified water tank of FIG. 3.

Referring to FIGS. 3 and 4, the purified water tank 200 can accommodate purified water and provide a space for the purified water to remain for a predetermined time. In addition, the purified water remaining in the purified water tank 200 may be cooled to a predetermined temperature or less. The purified water tank 200 may include a tank main body 210, a discharge buffer part 220, an outlet tube 230, a gasket 240, an inlet part 250, a partition wall member 260, and a baffle 270.

The tank main body 210 may provide a space in which purified water is accommodated. The space inside the tank main body 210 may be partitioned into a plurality of spaces by the partition wall member 260. In addition, purified water introduced into the tank main body 210 may flow from the upper side of the tank main body 210 to the lower side. For example, purified water flows into the top of the tank main body 210 and is discharged from the bottom of the tank main body 210, and the purified water discharged from the tank main body 210 may flow into the discharge buffer part 220. An accommodation space 211 may be formed in the tank main body 210. Meanwhile, the tank main body 210 may be connected to a cooler (not shown), and purified water in the accommodation space 211 may be cooled to a predetermined temperature or less by the cooler.

Figure 5:
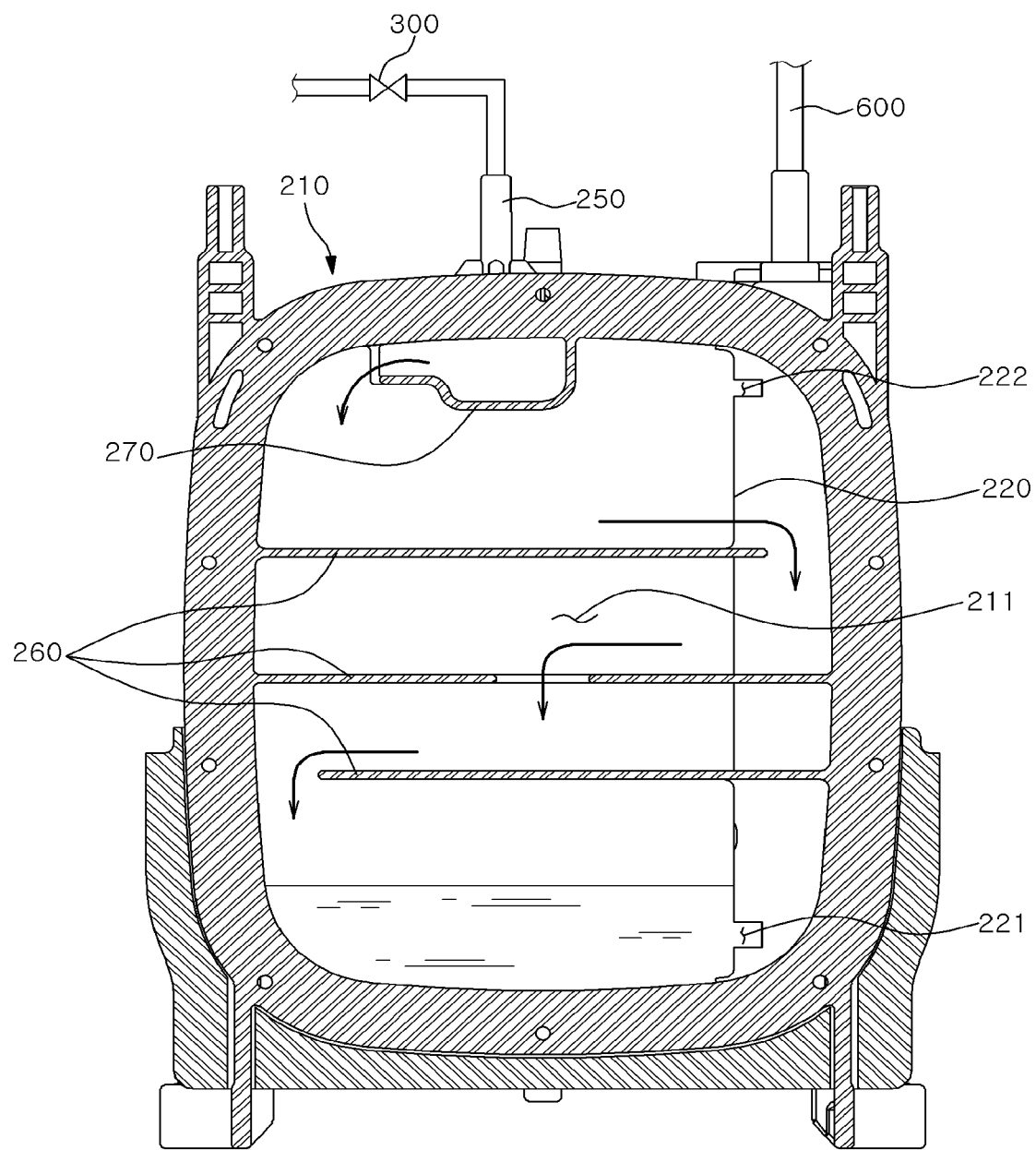
FIG. 5 is a cross-sectional view taken along line IV-IV of FIG. 3.

Referring to FIG. 5, the accommodation space 211 may provide a space in which purified water flows. The accommodation space 211 is formed inside the tank main body 210 and may be partitioned into a plurality of spaces by one or more partition wall members 260. Purified water may flow along the plurality of spaces. Meanwhile, purified water in the accommodation space 211 may flow from upper side to lower side, and may be cooled to the predetermined temperature or lower while flowing.

In addition, the accommodation space 211 may communicate with a discharge passage 223 through an inlet 221 and a communication hole 222. Accordingly, the purified water flowing downward in the accommodation space 211 may flow to the discharge passage 223 through the inlet 221, and may flow upward again through the discharge passage 223. Meanwhile, purified water and gas may be mixed in the accommodation space 211, and a gas layer may be formed in the upper side of the accommodation space 211.

The discharge buffer part 220 may guide the purified water in the accommodation space 211 to the outlet tube 230. The discharge buffer part 220 extends in the up-down direction and may be supported on one side of the tank main body 210. For example, the discharge buffer part 220 may have a hollow shape to allow purified water to flow. The inlet 221, the communication hole 222, and the discharge passage 223 may be formed in the discharge buffer part 220.

The inlet 221 may communicate with the accommodation space 211 and the discharge passage 223 so that the purified water in the accommodation space 211 flows into the discharge passage 223. In other words, one side of the inlet 221 may communicate with the accommodation space 211 and the other side may communicate with the discharge passage 223. For example, since the purified water of low temperature is located in the lower side of the accommodation space 211, the inlet 221 is formed in the lower side of the discharge buffer part 220. Accordingly, the low-temperature purified water remaining in the lower side of the accommodation space 211 may flow into the discharge passage 223 through the inlet 221. In addition, the inlet 221 is located below the gasket 240, and the purified water introduced into the discharge passage 223 through the inlet 221 is filled up from the lower side of the gasket 240.

The communication hole 222 may be formed in the discharge buffer part 220 to allow the gas remaining in the accommodation space 211 to flow to the discharge passage 223. For example, when purified water starts to fill the accommodation space 211, the gas remaining in the accommodation space 211 may be discharged to the outside through the communication hole 222 and the outlet tube 230. The communication hole 222 may communicate with the accommodation space 211 and the discharge passage 223. In other words, one side of the inlet 221 may communicate with the accommodation space 211 and the other side may communicate with the discharge flow path 223. The communication hole 222 is formed to extend through the discharge buffer part 220 and may be formed in the upper side of the discharge buffer part 220. In addition, the communication hole 222 is located above the gasket 240 to be described later.

Figure 6:
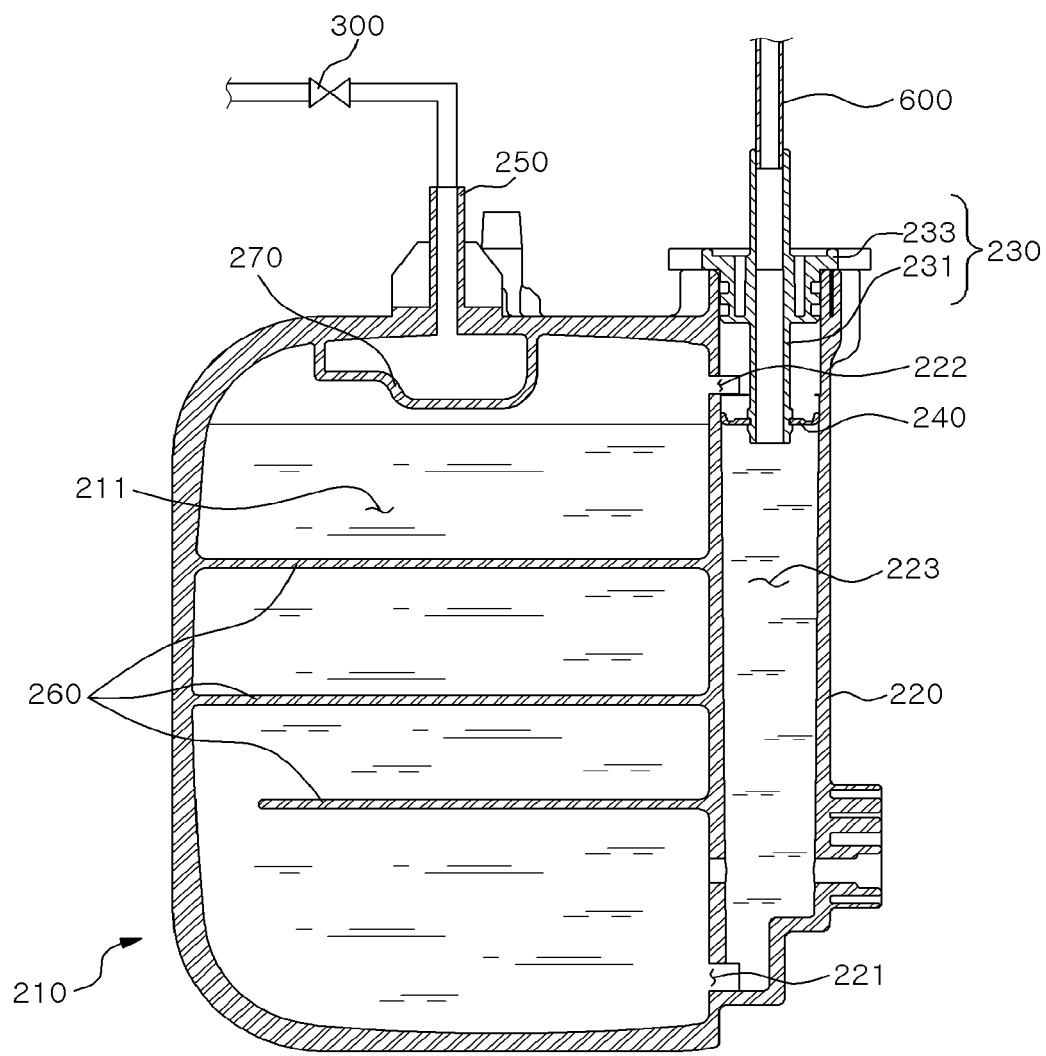
FIG. 6 is a cross-sectional view taken along line VI-VI of FIG. 3.

Referring to FIG. 6, the discharge passage 223 may provide a passage through which purified water and gas flow. The discharge passage 223 may be formed in the inner space of the discharge buffer part 220. In addition, the discharge passage 223 may communicate with the accommodation space 211 through the inlet 221 and the communication hole 222, and may communicate with the outside through the outlet tube 230. The gasket 240 may be disposed inside the discharge passage 223, and the discharge passage 223 may be partitioned by the gasket 240.

The outlet tube 230 may guide the purified water from the discharge passage 223 to the outlet 400. In addition, the outlet tube 230 may extend downward to be inserted into the discharge buffer part 220. The outlet tube 230 may include an insertion portion 231 and a sealing portion 233.

The insertion portion 231 is provided to be inserted inside the discharge buffer part 220, and may guide purified water to the discharge flow path 600 to be described later. One side of the insertion portion 231 may communicate with the discharge passage 223 and the other side thereof may communicate with the discharge flow path 600. For example, the insertion portion 231 may extend in the up-down direction. In addition, the insertion portion 231 may extend through the gasket 240 such that a lower end thereof is disposed below the gasket 240. Purified water may flow in the insertion portion 231.

The sealing portion 233 may seal between the insertion portion 231 and the discharge buffer part 220 to prevent gas and liquid from flowing between the insertion portion 231 and the discharge buffer part 220. The sealing portion may be provided to surround the insertion portion 231 and may be provided to block the discharge passage 223. For example, the sealing portion 233 may have an elastic material.

Figure 7:
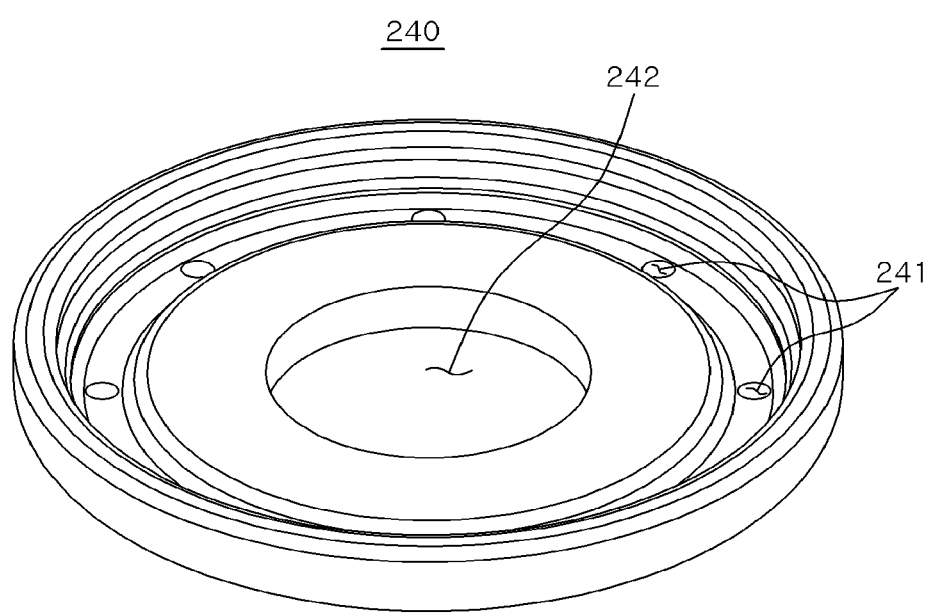
FIG. 7 is a perspective view of a gasket of FIG. 4.

Referring to FIGS. 6 and 7, the gasket 240 may reduce sloshing of the purified water remaining in the inner space of the discharge buffer part 220, that is, the discharge passage 223. For example, when the inlet valve 300 is opened and purified water flows into the accommodation space 211 or when the inlet valve 300 is blocked after the purified water flows into the tank main body 210, vibration occurs due to the flow of purified water and the change in pressure in the gas layer. The vibration causes the purified water in the accommodation space 211 to slosh, and applies a predetermined pressure to the purified water remaining in the discharge passage 223. In this case, the gasket 240 prevents the purified water in the discharge passage 223 from sloshing. Accordingly, purified water remaining in the discharge passage 223 can be prevented from flowing into the insertion portion 231, which prevents the occurrence of residual water due to the purified water inside the water outlet tube 230 discharged to the outside.

Meanwhile, the gasket 240 may be fixedly supported on any one of the discharge buffer part 220 and the outlet tube 230. For example, the gasket 240 is provided to be fixedly supported on an inner wall of the discharge buffer part 220, and the outlet tube 230 may be inserted into the gasket 240. As another example, the gasket 240 is provided to be fixedly supported on the outlet tube 230 and may be inserted into the discharge buffer part 20 together with the outlet tube 230. In this way, the gasket 240 may extend from the outlet tube 230 to an inner peripheral surface of the discharge buffer part 220 to prevent the purified water below the gasket 240 from sloshing between the discharge buffer part 220 and the outlet tube 230. The gasket 240 may have a shape capable of partitioning a space below the gasket 240 and a space above the gasket 240 in the discharge passage 223 to prevent sloshing. For example, the gasket 240 may have a plate shape, and an outer peripheral surface of the gasket 240 may have a shape corresponding to the inner peripheral surface of the discharge buffer part 220. The gasket 240 may be formed of an elastic material and fitted into the water outlet tube 230.

In addition, one or more through-holes 241 may be formed in the gasket 240. The one or more through-holes 241 may be formed in the gasket 240 to penetrate the gasket 240 in the up-down direction. Accordingly, gas may flow through the gasket 240 in the up-down direction through the one or more through-holes 241. The one or more through-holes 241 may be provided so that gas remaining in the accommodation space 211 is discharged to the outside when purified water flows into the accommodation space 211. For example, when purified water flows into the accommodation space 211, gas flows from the accommodation space 211 into the discharge passage 223 through the communication hole 222. In this case, the gas introduced into the discharge passage 223 flows to the lower side of the gasket 240 through the through-hole 241 and is then discharged to the outside through the outlet tube 230. As such, since the through-hole 241 is formed, the space below the gasket 240 partitioned by the gasket 240 in the discharge passage 223 may communicate with the space above the gasket 240.

A plurality of through-holes 241 may be provided, and the plurality of through-holes 241 may be spaced apart from each other along the outer peripheral surface of the gasket 240 by a predetermined distance. In addition, the plurality of through-holes 241 may be formed in the gasket 240 to be closer to the outer peripheral surface than the inner peripheral surface of the gasket 240. Meanwhile, an inner peripheral surface of the gasket 240 may form an insertion hole 242 into which the outlet tube 230 may be inserted. The insertion hole 242 may be formed at the center of the gasket 240 and may be provided so that the insertion portion 231 extends therethrough. In addition, the shape of the insertion hole 242 may be formed to correspond to an outer peripheral surface of the insertion portion 231.

The inlet part 250 may guide purified water flowing into the tank main body 210 to the accommodation space 211. The inlet part 250 may be connected to the inlet valve 300, and the flow rate of the purified water introduced by the inlet valve 300 may be adjusted. Meanwhile, the inlet part 250 may be formed at an upper portion of the tank main body 210 in order to prevent the introduced purified water from being rapidly mixed with purified water of low temperature. In other words, the purified water introduced into the accommodation space 211 through the inlet part 250 may be supplied to the upper side in the tank main body 210 in order to keep the temperature of the discharged purified water at low. In addition, the inlet part 250 may have, for example, a pipe shape having an inlet.

Referring back to FIG. 5, the partition wall member 260 may guide the flow of purified water in the accommodation space 211. The partition wall member 260 may partition the accommodation space 211 into a plurality of spaces. In addition, one or more partition wall members 260 may be provided, and one or more partition wall members 260 may extend in a horizontal direction. For example, one end of the partition wall member 260 may be supported on an inner wall of the tank main body 210, and the other end of the partition wall member 260 may be horizontally spaced apart from the inner wall of the tank main body 210 by a predetermined distance. As such, purified water may flow from the upper side to the lower side through the separation space between the partition wall member 260 and the tank main body 210. In addition, a plurality of partition wall members 260 may be provided, and the plurality of partition wall members 260 may be supported by the tank main body 210 so as to be spaced apart from each other in the up-down direction.

The baffle 270 may guide the purified water introduced into the tank main body 210 through the inlet part 250 to the partition wall member 260. The baffle 270 is configured so that when purified water of a predetermined temperature or higher flows in, the purified water first flows along the baffle 270 without being immediately mixed with the purified water in the accommodation space 211, and is then mixed with the purified water in the accommodation space 211. Accordingly, the purified water introduced into the accommodation space 211 can be prevented from being rapidly mixed with the purified water of low temperature remaining in the accommodation space 211. In addition, the purified water in the accommodation space 211 can be maintained at a low temperature. For example, the baffle 270 may extend in the horizontal direction and may be supported on the tank main body 210 at an upper side of the tank main body 210. Moreover, the baffle 270 may be disposed corresponding to the position of the inlet part 250.

The inlet valve 300 may open and close a passage through which purified water flows. The inlet valve 300 may guide some of the purified water filtered in the filter 500 that needs to be cooled to the purified water tank 200. For example, when the inlet valve 300 is opened, the purified water may be introduced into the purified water tank 200. In addition, when the inlet valve 300 is closed, the purified water flowing into the purified water tank 200 is blocked and a certain vibration may occur. Such vibration may be transmitted to the gas layer remaining in the upper side of the purified water tank 200, which may cause the purified water in the accommodation space 211 to slosh.

The discharge port 400 may discharge the purified water discharged from the purified water tank 200 to the outside to provide the purified water to the user. The discharge port 400 may be supported on the outside of the frame 100, and some of the discharge port 400 may be open outward. In addition, the discharge port 400 is connected to the discharge flow path 600, and may discharge the purified water passing through the discharge flow path 600 to the outside. For example, the discharge port 400 may include a cock or a facet and the like.

The filter 500 may filter raw water flowing into the water purifier 1 into purified water. The raw water may be introduced into the filter 500, and the purified water filtered in the filter 500 may flow to the inlet valve 300. In addition, one or more filters 500 may be provided and may be provided to be replaceable in the frame 100.

The discharge flow path 600 provides a passage through which purified water flows, and may guide the purified water introduced from the insertion portion 231 to the discharge port 400. One side of the discharge flow path 600 may be connected to the insertion portion 231, and the other side may be connected to the discharge port 400. In addition, no opening/closing valve may be provided in the discharge flow path 600. In other words, even when the discharge flow path is open to communicate with the outside of the water purifier, and the purified water in the discharge flow path can flow freely, the flow of the purified water into the discharge port can be controlled by the opening and closing of the inlet valve. Accordingly, the purified water remaining in the discharge flow path 600 flows to the discharge port 400 while being pushed by the purified water introduced from the insertion portion 231. In other words, when the inlet valve 300 is opened and the purified water is introduced into the purified water tank 100, the purified water in the discharge flow path 600 flows to the discharge port 400. In this way, the discharge of the purified water may be controlled by the inlet valve 300 without providing an opening/closing valve in the discharge flow path 600.

Hereinafter, the operation and effect of the water purifier 1 having the configuration as described above will be described.

The water purifier 1 according to one embodiment of the present disclosure can filter raw water to provide purified water to the user, and cool the raw water to provide cold purified water to the user. The water purifier 1 may receive raw water from the outside, and the raw water is filtered through the filter 500. The purified water filtered in the filter 500 can flow through the inlet valve 300 to the purified water tank 200.

When the inlet part 250 is opened by the inlet valve 300, the purified water may be introduced into the tank main body 210. The purified water introduced into the accommodation space 211 can flow along the baffle 270 and one or more partition wall members 260. In an initial state where the purified water is not filled in the accommodation space 211, the purified water flows to the lower side in the accommodation space 211 and passes through the inlet 221 to flow to the discharge passage 223. In this case, the gas in the accommodation space 211 may be discharged to the outside by sequentially passing through the communication hole 222, the through-hole 241 and the water outlet tube 230. In addition, when the purified water is continuously flowing into the accommodation space 211, the purified water will be filled in the accommodation space 211 and the discharge passage 223, and can be cooled at a predetermined temperature or less.

When the purified water in the discharge passage 223 goes beyond the bottom end of the insertion portion 231, the gas is no longer discharged to the outside, and when the purified water in the discharge passage 223 exceeds a predetermined height, the purified water is introduced into the insertion portion 231 by the pressure of the gas layer. The purified water introduced into the insertion portion 231 is discharged to the outside by sequentially passing through the discharge flow path 600 and the discharge port 400.

Meanwhile, when the inlet valve 300 is opened by the user's operation, as described above, the purified water is cooled at the predetermined temperature or less and discharged to the outside. In addition, when the inlet valve 300 is closed by the user's operation, the purified water is no longer discharged to the outside since the purified water flowing into the tank main body 210 is blocked. In this case, the purified water remains in the discharge port 400, an inner tube of the outlet tube 230, the discharge buffer part 220, and the tank main body 210.

In the water purifier 1 according to one embodiment of the present disclosure, the water outlet tube 230 does not include therein an opening/closing valve that functions such as the inlet valve 300. Accordingly, the purified water discharged to the outside through the outlet tube 230 can be controlled by the operation of the inlet valve 300. For example, when the inlet valve 300 is opened, the purified water can be introduced to the tank main body 210, and the purified water in the discharge passage 223 is introduced into the outlet tube 230 by the introduced purified water. The purified water remaining in the outlet tube 230 is pushed by the purified water introduced into the outlet tube 230 to be discharged to the outside through the discharge port 400.

In this way, even when the opening/closing valve is not provided in the outlet tube 230, the amount of purified water discharged to the outside through the discharge port 400 can be controlled only by the opening and closing of the inlet valve 300. In addition, by not including the opening/closing valve in the outlet tube 230, the size of the water purifier 1 becomes significantly smaller than the conventional one.

In addition, when the inlet valve 300 is closed, even though the purified water in the accommodation space 211 sloshes, the gasket 240 can prevent the purified water from flowing into the outlet tube 230 by preventing the purified water of the discharge passage 223 from sloshing. That is, the occurrence of the residual water discharged to the outside of the water purifier 1 can be prevented.

Although the embodiments of the present disclosure have been described as specific embodiments, these are merely examples. The present disclosure is not limited to the above, and should be interpreted as having the broadest scope according to the technical idea disclosed in the present specification. Those skilled in the art may combine/substitute the disclosed embodiments to implement a pattern of a shape not disclosed, but this also does not depart from the scope of the present disclosure. In addition, those skilled in the art may easily change or modify the disclosed embodiments based on the present specification, and it is clear that such changes or modifications also fall within the scope of the present disclosure.

What is claimed is:

1. A water purifier that purifies water to provide purified water, the water purifier comprising:
   a purified water tank for accommodating the purified water, and
   a discharge port for discharging the purified water to an outside of the water purifier,
   wherein the purified water tank includes:
   a tank main body that provides an accommodation space for accommodating the purified water;
   a discharge buffer part having an inlet which communicates with the accommodation space so that the purified water in the accommodation space flows in the discharge buffer part, the discharge buffer part extending in an up-down direction;
   an outlet tube including an insertion portion extending downward in the discharge buffer part to discharge the purified water to the discharge port through a discharge flow path; and
   a gasket extending from the insertion portion to an inner peripheral surface of the discharge buffer part to reduce sloshing of the purified water in the discharge buffer part,
   wherein the tank main body includes a plurality of partition wall members for partitioning the accommodation space into a plurality of accommodation spaces,
   the plurality of partition wall members are spaced apart from each other in the up-down direction,
   one end of each of the partition wall members is supported on an inner wall of the tank main body and the other end of each of the partition wall members is horizontally spaced apart from the inner wall of the tank main body by a predetermined distance, and
   wherein the discharge buffer part further includes a communication hole,
   the discharge buffer part communicates with an uppermost accommodation space among the plurality of accommodation spaces partitioned by the plurality of partition wall members through the communication hole, and the communication hole is provided above the gasket.

2. The water purifier of claim 1, wherein a lower end of the insertion portion is disposed below the gasket.

3. The water purifier of claim 1, wherein the purified water tank further includes an inlet part that is connected to an upper portion of the tank main body and guides the purified water into the accommodation space,
the inlet is provided below the gasket and communicates the discharge buffer part and the accommodation space, and
the purified water in the accommodation space flows to the discharge buffer part through the inlet.

4. The water purifier of claim 1, wherein the gasket includes one or more through-holes formed to penetrate the gasket in the up-down direction.

5. The water purifier of claim 1, wherein the outlet tube further includes a sealing portion that seals between the insertion portion and the discharge buffer part to prevent gas from flowing between the insertion portion and the discharge buffer part.

6. The water purifier of claim 1, wherein the gasket is fixedly supported on any one of the discharge buffer part and the outlet tube.

7. The water purifier of claim 1, further comprising:
an inlet valve that selectively blocks a passage through which the purified water flows into the purified water tank.

8. The water purifier of claim 7, wherein the discharge flow path is open to communicate with the outside of the water purifier, and the flow of the purified water to the discharge port is controlled by opening and closing of the inlet valve.

9. A purified water tank comprising:
a tank main body that provides an accommodation space for accommodating purified water;
a discharge buffer part having an inlet which communicates with the accommodation space so that the purified water in the accommodation space flows the discharge buffer part, the discharge buffer part extending in an up-down direction;
an outlet tube including an insertion portion extending downward in the discharge buffer part to discharge the purified water to a discharge port through a discharge flow path; and
a gasket extending from the insertion portion to an inner peripheral surface of the discharge buffer part to reduce sloshing of the purified water in the discharge buffer part,
wherein the tank main body includes a plurality of partition wall members for partitioning the accommodation space into a plurality of accommodation spaces,
the plurality of partition wall members are spaced apart from each other in the up-down direction, and
one end of each of the partition wall members is supported on an inner wall of the tank main body, and the other end of each of the partition wall members is horizontally spaced apart from the inner wall of the tank main body by a predetermined distance; and
wherein the discharge buffer part further includes a communication hole, and the discharge buffer part communicates with an uppermost accommodation space among the plurality of accommodation spaces partitioned by the plurality of partition wall members through the communication hole.

* * * * *